United States Patent [19]

Pürrer

[11] 4,059,234
[45] Nov. 22, 1977

[54] FIELD CHOPPER
[75] Inventor: Josef Pürrer, Modling, Austria
[73] Assignee: Maschinenfabrik Fahr Aktiengesellschaft Gottmadingen, Gottmadingen, Germany
[21] Appl. No.: 698,493
[22] Filed: June 22, 1976
[30] Foreign Application Priority Data
June 27, 1975 Germany .............................. 2528829
[51] Int. Cl.² ............................................. B02C 23/02
[52] U.S. Cl. ................................................... 241/222
[58] Field of Search ............. 241/186 R, 186.2, 186.4, 241/222, 101.2, 101.7

[56] References Cited
U.S. PATENT DOCUMENTS

| 1,213,192 | 1/1917 | Heebner ................................ 241/222 |
| 1,515,377 | 11/1924 | White ................................... 241/222 |
| 3,195,595 | 7/1965 | Corwith et al. ..................... 241/101.7 |
| 3,889,887 | 6/1975 | Wagstaff et al. ................... 241/101.2 |

Primary Examiner—Granville Y. Custer, Jr.
Attorney, Agent, or Firm—Karl F. Ross

[57] ABSTRACT

A field chopper, having a chopper drum or reel rotatable on the chassis and a plurality of feed rollers for advancing the crop material to the chopper drum, is provided with a pair of arms flanking the drum and swingable about the axis thereof. The arms each carry a pivotal compensating bar, a pair of pressing rollers being journaled on these arms and being driven by gears meshing with a central pinion whose shaft forms the axis of one of the bars and is, in turn, driven by a transmission. The pressing roller proximal to the blade drum is received in notches in the compensating bars and is connected thereto so as to be easily releasable.

2 Claims, 5 Drawing Figures

FIELD CHOPPER

FIELD OF THE INVENTION

The present invention relates to a field chopper and, more particularly, to a field chopper of the type in which a blade drum is journaled for rotation on a chasis and is fed with a crop material by a plurality of rollers cooperating with pressing rollers which bear downwardly on the crop material.

BACKGROUND OF THE INVENTION

A field chopper generally comprises a vehicle chassis or frame which may be towed by a tractor or self-propelled and which carries a blade drum or reel rotatable about a horizontal axis and driven by the power take-off of the tractor or a prime mover carried on the chassis or frame.

At the front end of the field chopper, a head is provided depending upon the nature of the crop material to be processed. For example, if a mown or swath crop is to be harvested, the pickup head may comprise an apron, conveyor or pickup drum to lift the mowed crop material from the ground and carry it toward the blade drum. If a standing crop is to be harvested, the apron or leading edge of the field chopper may be provided with a sickle bar or the like for simultaneously mowing the crop. When corn or another row crop is to be harvested, the head generally comprises guide shoes forming a throat into which the upright stalks are guided and chains or the like for engagement with these stalks to carry them toward the cutter drum in the proper orientation for subdivision. Means may be provided for severing the stalks just above the ground level.

The field chopper may also comprise a blower for displacing the comminuted material into a forage wagon or other conveyance which may be drawn along the field chopper and with means between the crop intake head and the cutter drum for advancing the crop material toward the latter.

The crop-advancing means can comprise, for example, a plurality of lower rollers over which the crop material is guided and respective pressing rollers which bear downwardly upon the crop material and press it against the lower rollers. Such rollers may be driven.

In the field chopper described in German Pat. No. 966,671, (corresponding to U.S. Pat. No. 2,747,634)system of the character described above, and are driven by a chain running over sprocket wheels connected to the pressing-roller shafts. In this construction it has been found that the chain drive is susceptible to damage and contamination and is of relatively expensive construction.

An especially important disadvantage of this system is that the chain drive makes the cutter drum and any counter blades on the vehicle chassis accessible only with difficulty. Frequently access to the cutter drum and the fixed blade or surface with which it cooperates must be made available for clearing jams, repairing damage or the like. Chain-drive systems of the aforementioned type are difficult to disassemble and make it particularly inconvenient to remove the pressing roller lying immediately ahead of the blade drum. The removal of such rollers is frequently necessary for convenient access to the blade drum.

OBJECTS OF THE INVENTION

It is an object of the present invention to provide an improved field chopper whereby the aforementioned disadvantages are avoided.

Another object of the invention is to improve the mounting and drive systems for the pressing rollers of a field chopper of the character described which enables ready access to the blade drum.

Still another object is to provide a strong and effective mounting for the pressing rollers of a system as described above, less susceptible to damage than earlier arrangements, and which facilitates access to the blade drum and counter blades, especially for repair or adjustment of the cutting gap, in a particularly simple and efficient manner.

SUMMARY OF THE INVENTION

These objects are attained, in accordance with the present invention, in an arrangement for a field chopper having a blade drum which comprises, between the blade drum and the crop-intake means (e.g. a stalk or swath crop pickup head), a plurality of pressing rollers (preferably two), one of which is relatively proximal to the drum and the other of which is spaced further therefrom. According to the invention, the two pressing rollers are journaled in a pair of compensating bars in mutually parallel spaced-apart relationship and are driven by respective gear wheels mounted on the respective shafts and meshing jointly with a central gear wheel whose shaft extends through at least one of the bars and forms a journal therefor whereby the bars are swingably mounted upon a pair of arms flanking the blade drums and swingable about the axis thereof.

Thus each of the driven gear wheels of the pressing rollers, each of which may cooperate with rollers fixed in the chassis of the machine and over which the crop material passes, mesh with a central driving pinion which, in turn, has an axis coinciding with the axis about which the compensating bars pivot.

According to an important feature of the invention, the ends of the shaft carrying the roller proximal to the blade drum are received in notches or recesses which open upwardly in the bar and enable the proximal rollers to be readily removed therefrom.

The pressing roller proximal to the drum can thus be easily removed by hand and access to the drum and any counter blade is readily afforded.

Since the axis of the central driving pinion, i.e. its drive shaft, forms the pivot for the compensating bars, which allow the pressing rollers to adjust to greater or lesser inputs of the crop material, no special journaling arrangement is requried for the compensating bars and the axes of both of the driven pinions of the pressing rollers and the axis of the driving central pinion can lie in a common plane.

According to another feature of the invention, the drive shaft with the central pinion passes through a bearing sleeve or bushing fixed to the swingable arm.

According to still another feature of the invention, for rapid and simple removal of the proximal pressing roller, the latter can be held on the compensating bar by nuts threaded onto opposite ends of its shaft and retaining a lug having a bent portion or flange underlying the compensating bar, thereagainst. Since the flange of the lug extends beneath the underside of the bar, the ends of the pressing roller shaft proximal to the drum, which are received in the aforementioned upwardly open notches or recesses, can not leave these recesses until the nuts are withdrawn sufficiently to enable the flanges to clear the underside of the compensating bars.

BRIEF DESCRIPTION OF THE DRAWINGS

The above and other objects, features and advantages of the present invention will become more readily apparent from the following desciption, reference being made to the accompanying drawing in which.

SPECIFIC DESCRIPTION

Figure 1:
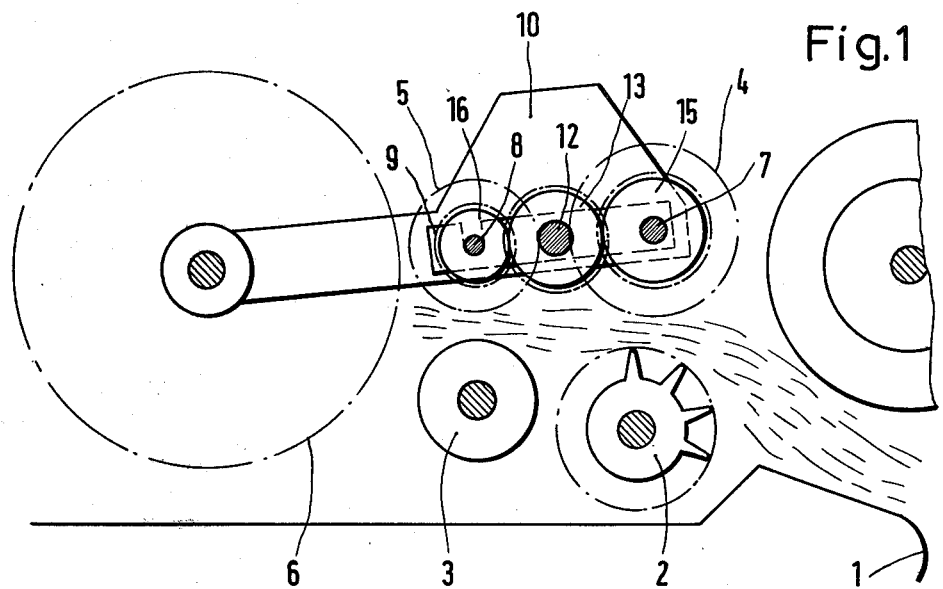
FIG. 1 is a diagrammatic side-elevational view of the cropadvancing mechanism a field chopper according to the invention, as seen partly in section along the line I-I of FIG. 2.

FIGS. 1 through 4 represent one side of the crop-advancing mechanism of a field chopper according to the invention which is provided with a crop-intake device 1 at the front side of the machine. This device can be an apron, conveyor belt or other arrangement for picking up previously mowed crop material lying in a swath, for cutting a swath through a standing crop and advancing the crop material towards a drum, or a corn head or the like for cutting a stalk crop from the ground and advancing the stalks to the blade drum. The field chopper is also provided with a blade drum or reel 6 downstream of the crop-intake device 1 in the direction of movement of the crop material and, between these elements, a pair of lower crop-advancing rollers 2 and 3 which can be driven by universal-joint shafts 29 and 31 (FIG. 5) and which can be respectively a ridged or toothed roller 2 and a smooth-surfaced roller 3.

Above the crop-displacing rollers 2 and 3, there are provided cooperating pressing rollers 4 and 5 which compact the crop material against the lower rollers and are driven in opposite senses relative thereto.

Figure 3:
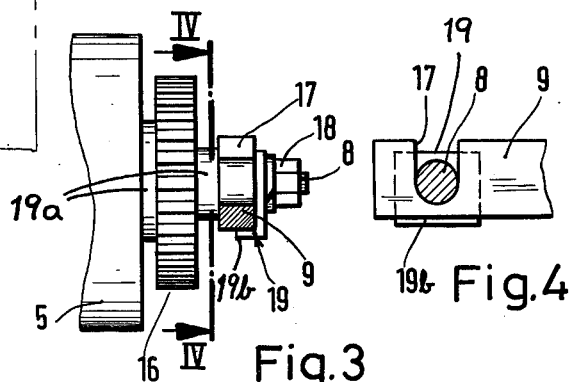
FIG. 3 is a detail view, drawn to an enlarged scale, showing one end of the pressing roller proximal to the blade drum in section through the compensating bar in which it is received.
Figure 4:
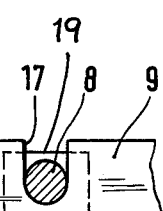
FIG. 4. is a section taken generally along the line IV-IV of FIG. 3.
Figure 5:
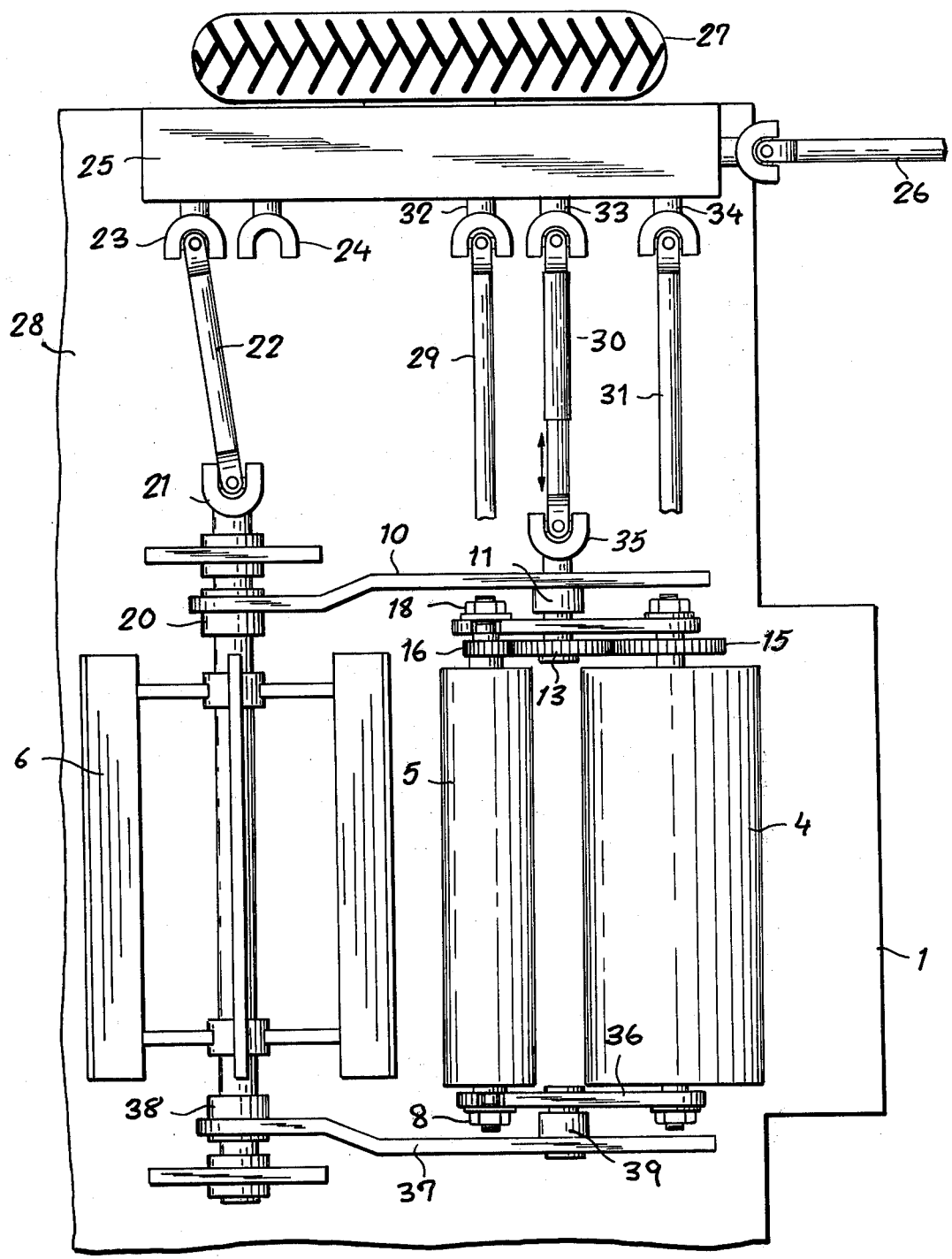
FIG. 5 is a plan view, also in diagrammatic form and partly broken away, illustrating the drive system for the arrangement of FIGS. 1 - 4

The upper pressing rollers 4 and 5 are journaled on respective shafts 7 and 8 on a pair of compensating arms, one of which has been shown at 9 in FIGS. 1 through 4, while the other is represented at 36 in FIG. 5.

On opposite sides of the blade drum 6, arms 10 and 37 are disposed which serve as carriers for the compensating arms 9 and 36. The arms 10 and 37 each are provided with a bushing 11, 39 traversed by respective shafts, one of which is shown at 12 in FIG. 2, simutaneously carrying a central pinion 13 and journaling the compensating bars on the arms 10 and 37. The arms 10 and 37 can have hubs 20 and 38 by which they are journaled upon the shaft carrying the blade drum 6. The central pinion 13 is keyed to the shaft 12.

The two upper pressing rollers 4 and 5 are each provided with a driven gear wheel 15, 16 which meshes with the central gear wheel 13 and is keyed to the shaft of the respective pressingroller. The drive shaft 12 of the pinion 13 is thus rotatable to drive the pinions 15 and 16 and hence the upper pressing rollers in the same sense. The swingability of the compensating bars 9 and 36 about the axis of the shaft 12 permits compensation for various thicknesses of the crop material passing between each upper roller 4 or 5 and each lower roller 2 or 3.

The shaft 12 is driven via a universal joint 35 by a universal joint shaft 30 while the blade drum 6 has a universal joint 21 on a universal joint shaft 22.

The machine also comprises a transmission 25 having a pair of output shafts 23, 24 rotatable in opposite senses and selectively receiving universal joint shaft 22 so that the blade drum can be driven in the ordinary sense in its position as shown in FIG. 5 or in the opposite sense for sharpening.

The transmission 25, which is driven by the tractor power takeoff 26, also has a plurality of shafts 32, 33 and 34, respectively connected to the universal-joint shafts 29, 30 and 31. The chassis 28 of the machine is carried on wheels, one of which is shown at 27 and can be towed by a tractor via a towbar (not shown).

Figure 2:
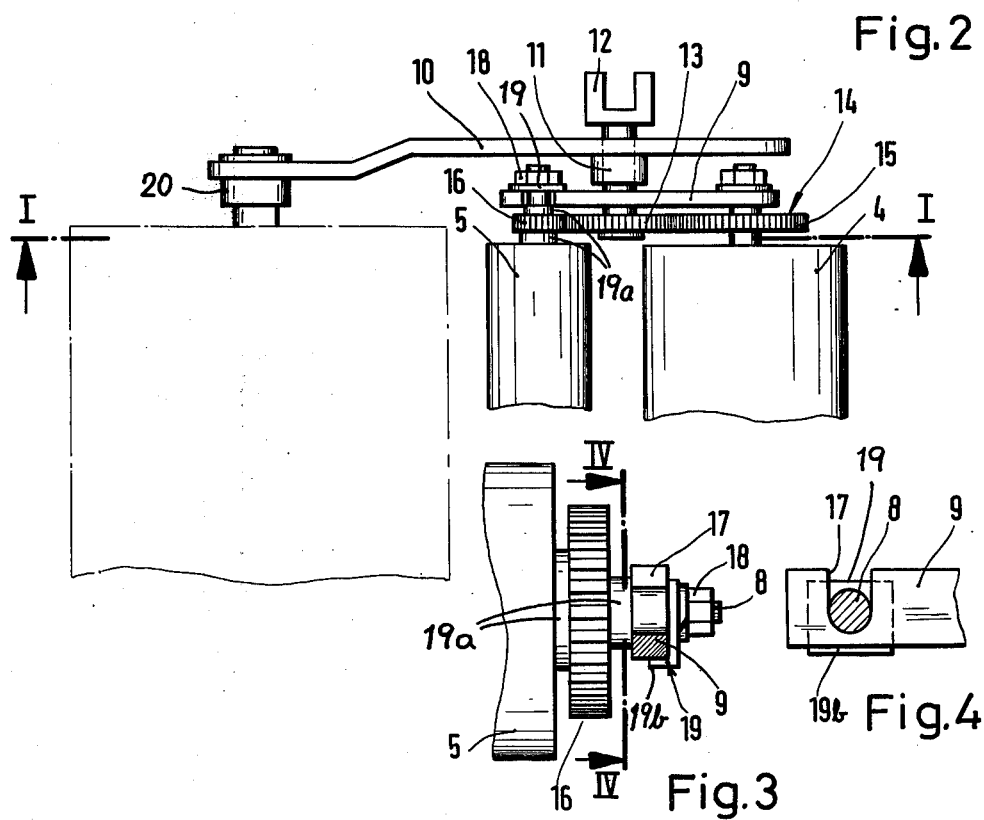
FIG. 2 is a fragmentary plan view of the portion of the field chopper shown in FIG. 1, also in somewhat diagrammatic form.

As can be seen from FIGS. 2 through 4 clearly, the end of the shaft 8 of the pressing roller 5 proximal to the blade drum 6 is received in an upwardly open recess 17 in the compensating bar 9 and is releasably held therein. A similar notch and fastening arrangement may be provided for the other end of the shaft 8 in the bar 36.

Nuts 18 at each end of the shaft clamp respective lugs 19 against the bars 9 and 36, the lugs 19 having flanges 19b which underlie the bar as shown in FIG. 4, for example, so that the shaft 8 cannot be lifted from its notch or recess 17 unless the nuts 18 are released.

The shaft 8 may also carry a hub 19a to which the pinion 16 and the roller 5 are keyed and which is freely rotatable on the shaft 8 so that the nut 18 and the lug 19 do not impede rotation of the roller 5.

For release of the pressing roller 5 proximal to the blade drum, the nuts 18 are simply backed out until the inwardly bent ends of the lugs 19 clear the lower edges of the bars 9 and 36, whereupon pressing roller 5 can be lifted out of the notches 17, the gear 16 simply unmeshing from the central pinion 13.

I claim:
1. A field chopper comprising:
  a machine support;
  a blade drum rotatably mounted on said support;
  crop-intake means on said support forwardly of and spaced from said blade drum for drawing crop material toward said blade drum;
  a pair of crop-feed rollers between said crop-intake means and said blade drum for advancing crop material towrds said drum;
  a pair of pressing rollers each associated with and disposed above one of said crop-feed rollers for holding crop material thereagainst;
  a pair of arms swingably mounted on said support;
  respective compensating bars pivotally mounted on said arms for swinging movement about an axis, said pressing rollers being rotatable on said compensating bars on opposite sides of said axis;
  a central pinion jounaled on one of said bars for rotation about said axis;
  respective pinions on said pressing rollers meshing with said central pinion; and
  means for releasably mounting the pressing roller proximal to said drum on said bars, said central pinion being driven to rotate said pressing rollers, said central pinion being provided with a shaft traversing said one of said bars and swingably mounting same on a respective one of said arms for pivotal movement about said axis, said one of said arms being formed with a bearing sleeve, said shaft traversing said bearing sleeve.

2. A field chopper comprising:

a machine support;

a blade drum rotatably mounted on said support;

crop-intake means on said support forwardly of and spaced from said blade drum for drawing crop material toward said blade drum;

a pair of crop-feed rollers between said crop-intake means and said blade drum for advancing crop material towards said drum;

a pair of pressing rollers each associated with and disposed above one of said crop-feed rollers for holding crop material thereagainst;

a pair of arms swingably mounted on said support;

respective compensating bars pivotally mounted on said arms for swinging movement about an axis, said pressing rollers being rotatable on said compensating bars on opposite sides of said axis;

a central pinion jounaled on one of said bars for rotation about said axis;

respective pinions on said pressing rollers meshing with said central pinion; and means for releasably mounting one of said pressing rollers proximal to said drum on the respective bar, said central pinion being driven to rotate said pressing rollers, said central pinion being provided with a shaft traversing said one of said bars and swingably mounting same on a respective one of said arms for pivotal movement about said axis, said one of said arms being formed with a bearing sleeve, said shaft traversing said bearing sleeve, said means for releasably mounting said proximal pressing roller on said bars including an upwardly open recess formed in each of said bars and receiving an end of a shaft carrying said proximal pressing roller, a respective nut threaded on each of said ends, and a respective lug secured by each nut on the respective end and having a bent portion underlying the respective bar.

* * * * *